(12) United States Patent
Yamashita

(10) Patent No.: US 8,226,113 B2
(45) Date of Patent: Jul. 24, 2012

(54) SIDE AIRBAG APPARATUS

(75) Inventor: Akira Yamashita, Aichi-ken (JP)

(73) Assignee: Toyoda Gosei Co., Ltd., Aichi-pref (JP)

( * ) Notice: Subject to any disclaimer, the term of this patent is extended or adjusted under 35 U.S.C. 154(b) by 148 days.

(21) Appl. No.: 12/659,633

(22) Filed: Mar. 16, 2010

(65) Prior Publication Data

US 2010/0244412 A1   Sep. 30, 2010

(30) Foreign Application Priority Data

Mar. 27, 2009   (JP) ................. 2009-080228

(51) Int. Cl.
*B60R 21/207* (2006.01)
*B60R 21/20* (2011.01)

(52) U.S. Cl. ................. 280/730.2; 280/728.2

(58) Field of Classification Search ........... 280/728.2, 280/730.1, 730.2
See application file for complete search history.

(56) References Cited

U.S. PATENT DOCUMENTS

| | | | | |
|---|---|---|---|---|
| 5,556,127 A * | 9/1996 | Hurford et al. | ............ | 280/730.2 |
| 5,564,739 A * | 10/1996 | Davidson | ............ | 280/736 |
| 5,669,627 A * | 9/1997 | Marjanski et al. | ......... | 280/728.3 |
| 5,690,354 A * | 11/1997 | Logan et al. | ............ | 280/728.2 |
| 5,752,714 A * | 5/1998 | Pripps et al. | ............ | 280/730.2 |
| 5,785,350 A * | 7/1998 | Inoue et al. | ............ | 280/743.2 |
| 5,816,610 A * | 10/1998 | Higashiura et al. | ......... | 280/728.3 |
| 5,826,938 A * | 10/1998 | Yanase et al. | ............ | 297/216.13 |
| 5,906,390 A * | 5/1999 | Phillion et al. | ............ | 280/728.3 |
| 6,213,498 B1 * | 4/2001 | Ghalambor et al. | ........ | 280/730.2 |
| 6,220,624 B1 * | 4/2001 | Abraham et al. | .......... | 280/728.2 |
| 6,254,123 B1 * | 7/2001 | Urushi et al. | ............. | 280/730.2 |
| 6,439,597 B1 * | 8/2002 | Harada et al. | ............. | 280/728.2 |
| 6,450,528 B1 * | 9/2002 | Suezawa et al. | ........... | 280/730.2 |
| 6,561,540 B1 * | 5/2003 | Hasegawa et al. | ......... | 280/730.2 |
| 7,281,735 B2 * | 10/2007 | Acker et al. | ............... | 280/730.2 |
| 2002/0024198 A1 * | 2/2002 | Umezawa et al. | ......... | 280/728.2 |
| 2002/0084630 A1 | 7/2002 | Aulbach | | |
| 2003/0168836 A1 * | 9/2003 | Sato et al. | .................. | 280/730.2 |
| 2004/0075255 A1 * | 4/2004 | Honda et al. | ............... | 280/730.2 |
| 2005/0023808 A1 * | 2/2005 | Sato et al. | .................. | 280/730.2 |
| 2006/0108777 A1 * | 5/2006 | Mabuchi et al. | ........... | 280/730.2 |
| 2006/0113769 A1 * | 6/2006 | Tracht | ......................... | 280/730.2 |
| 2006/0186645 A1 | 8/2006 | Aulbach | | |
| 2007/0222191 A1 * | 9/2007 | Tracht | ......................... | 280/730.2 |
| 2007/0273129 A1 * | 11/2007 | Inoue | ......................... | 280/730.2 |

(Continued)

FOREIGN PATENT DOCUMENTS

| | | |
|---|---|---|
| JP | A-08-310336 | 11/1996 |
| JP | A-2001-114060 | 4/2001 |
| JP | A-2009-035089 | 2/2009 |

*Primary Examiner* — Toan C To
*Assistant Examiner* — Barry Gooden, Jr.
(74) *Attorney, Agent, or Firm* — Posz Law Group, PLC

(57) ABSTRACT

A side airbag apparatus is provided in a side portion of a vehicle seat back located on the vehicle outer side. The side airbag apparatus includes an airbag unit elongated in the up-down direction and a plate fixed to the airbag unit. The airbag unit has an airbag and an inflator. The plate has a fixing portion and a rear wall portion. The inner side surface of the airbag unit is fixed to the fixing portion. The rear wall portion covers an upper half portion of the airbag unit. The rear wall portion also partly covers the rear surface of the lower half portion of the airbag unit. The plate is made of resin and has flexibility and elasticity.

5 Claims, 4 Drawing Sheets

U.S. PATENT DOCUMENTS

| | | | |
|---|---|---|---|
| 2008/0174093 A1* | 7/2008 | Inoue | 280/730.2 |
| 2008/0203787 A1 | 8/2008 | Tracht et al. | |
| 2009/0206585 A1* | 8/2009 | Honda | 280/730.2 |
| 2009/0315305 A1* | 12/2009 | Evans et al. | 280/730.2 |
| 2010/0078919 A1* | 4/2010 | Naruse et al. | 280/728.2 |
| 2010/0194083 A1* | 8/2010 | Sugimoto et al. | 280/730.2 |
| 2010/0295282 A1* | 11/2010 | Kim et al. | 280/730.2 |
| 2011/0057487 A1* | 3/2011 | Suzuki | 297/216.13 |

* cited by examiner

SIDE AIRBAG APPARATUS

BACKGROUND OF THE INVENTION

The present invention relates to a side airbag apparatus accommodated in a vehicle seat.

Conventional side airbag apparatuses are provided in, for example, a side portion of a vehicle seat back located on the vehicle outer side. When a side collision of a vehicle occurs, the airbag projects from a side portion of a seat back on the vehicle outer side and is inflated and deployed in a space between an occupant and a side body including a door, thereby protecting region of the occupant's body including the thorax and the head. Japanese Laid-Open Patent Publication No. 2001-114060 discloses such a side airbag apparatus. This airbag apparatus includes an airbag unit, which includes an airbag and an inflator, and a case storing the airbag. The case is formed by a base plate covering a part of the airbag located on the vehicle inner side and a back guide covering the rear portion of the airbag. The airbag unit is installed by fixing the base plate, which is a part of the case, to the frame of the seat back with bolts and nuts. The airbag unit is thus retained in the seat back.

The airbag contained in the airbag unit is designed to be arranged beside a region of an occupant's body including the thorax and the head. The airbag thus has an elongated shape extending in the up-down direction. Accordingly, the case, which accommodates the elongated airbag, is large, which increases the size of the side airbag apparatus. In this regard, conventional side airbag apparatuses have been desired to be improved.

Also, conventional side airbag apparatuses have room for improvement in the following aspects. For example, an occupant might unintentionally push a side airbag apparatus by putting a hand on the seat back when getting in or out of the vehicle. In such a case, the conventional airbag apparatus described above may be felt by the occupant, who in turn may be disturbed by the feel.

SUMMARY OF THE INVENTION

Accordingly, it is an objective of the present invention to provide a side airbag apparatus that has a size that is not significantly increased even if an elongated airbag unit is used, and reduces disturbing sensation experienced by an occupant when he/she putting a hand on the seat back.

To achieve the foregoing objective and in accordance with one aspect of the present invention, a side airbag apparatus provided in a side portion of a seat back of a vehicle seat is provided. The apparatus includes an elongated airbag unit and a plate. The airbag unit extends in an up-down direction, and has a folded airbag and an inflator installed in the airbag. At a side collision of a vehicle, the airbag is inflated and deployed outward and forward in relation to the vehicle seat. The plate is used for installing the airbag unit in the side portion of the seat back. The plate includes a fixing portion to which an inner side of the airbag unit is fixed, and a rear wall portion connected to the fixing portion. The rear wall portion covers at least a part of a rear surface of the airbag unit, the part being located above the inflator. The plate has flexibility and elasticity.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

Hereinafter, a side airbag apparatus according to one embodiment of the present invention will be described with reference to FIGS. 1 to 6. When explaining directions in the following, the traveling direction of the vehicle is defined as a forward direction, and the backward, upward, downward, leftward, and rightward directions are defined with reference to the forward direction. In regard to a vehicle seat, the directions are defined with reference to a state where the seat is installed in a vehicle. Also, in regard to the side airbag apparatus, the directions are defined with reference to a state where the apparatus is installed in the vehicle seat.

Figure 1:
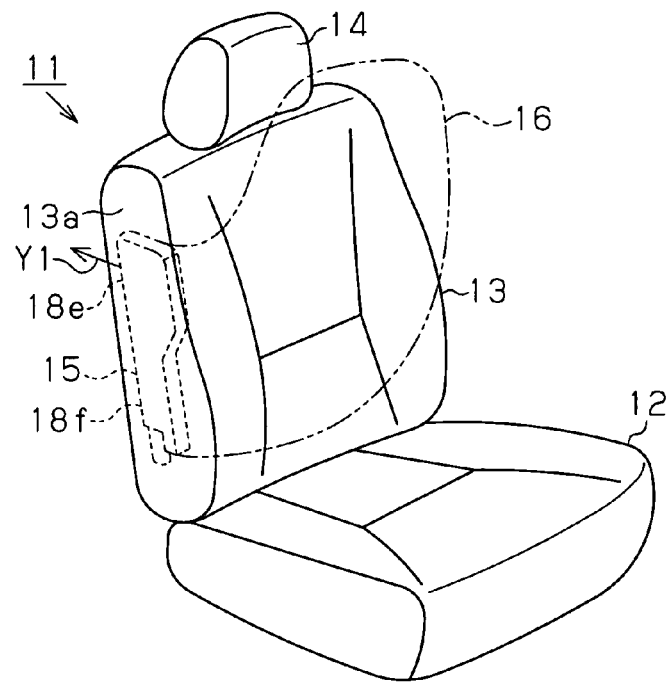
FIG. 1 is a perspective view illustrating a vehicle seat in which a side airbag apparatus according to one embodiment of the present invention is mounted.

As shown in FIG. 1, a vehicle seat 11 is installed in a passenger compartment, and includes a seat portion 12 and a seat back 13. The seat portion 12, which is located in a lower portion of the vehicle seat 11, is fixed to the floor surface of the passenger compartment. At the rear end of the seat portion 12, the upward extending seat back 13 is supported by the seat portion 12. The seat back 13 supports the headrest 14. Also, the seat back 13 has a side portion 13a located on the vehicle outer side. A side airbag apparatus 15 is located in the side portion 13a.

Figure 2:
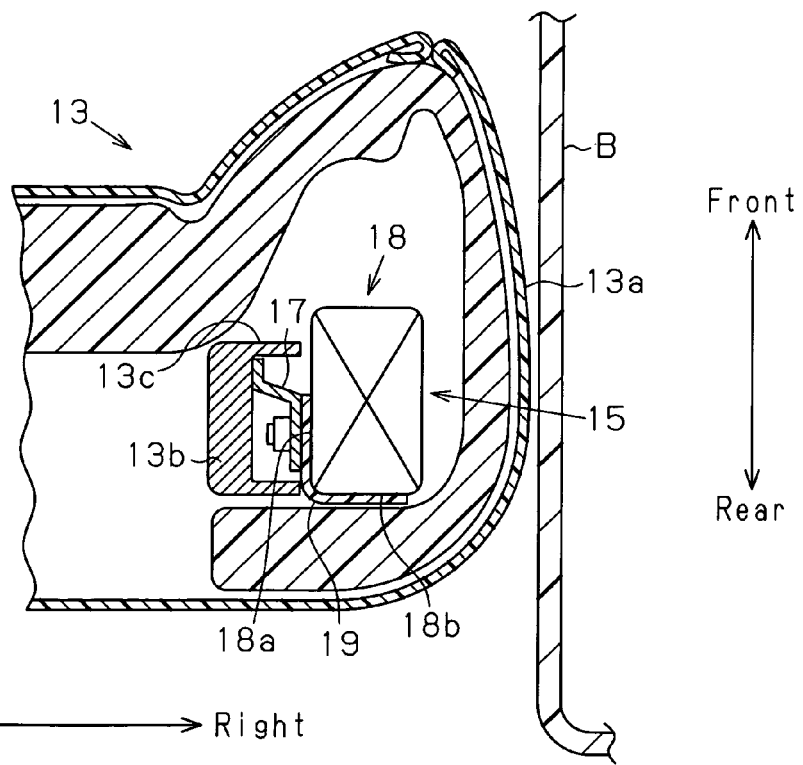
FIG. 2 is a cross-sectional view illustrating the side airbag apparatus, which is located in a side portion of the seat back on the vehicle outer side.
Figure 6:
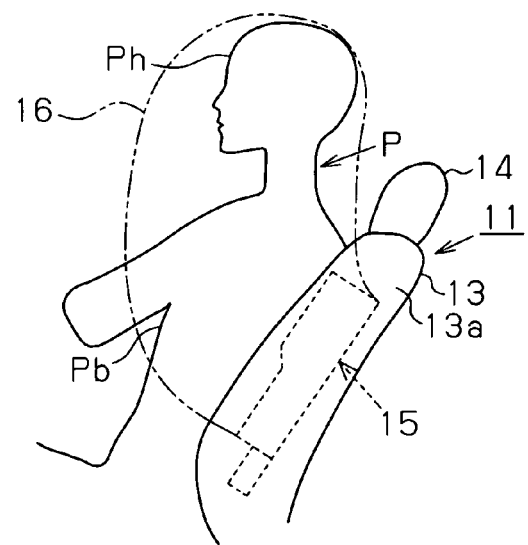
FIG. 6 is a side view illustrating the airbag when inflated and deployed.

As shown in FIG. 6, the side airbag apparatus 15 has an airbag 16 that is capable of being largely inflated upward so as to protect the thorax Pb and the head Ph of an occupant P. As shown in FIG. 2, the side airbag apparatus 15 is attached to a side frame 13b of the seat back 13 in the side portion 13a of the seat back 13 with a bracket 17. The side airbag apparatus 15 includes an airbag unit 18 and a plate 19.

Figure 3:
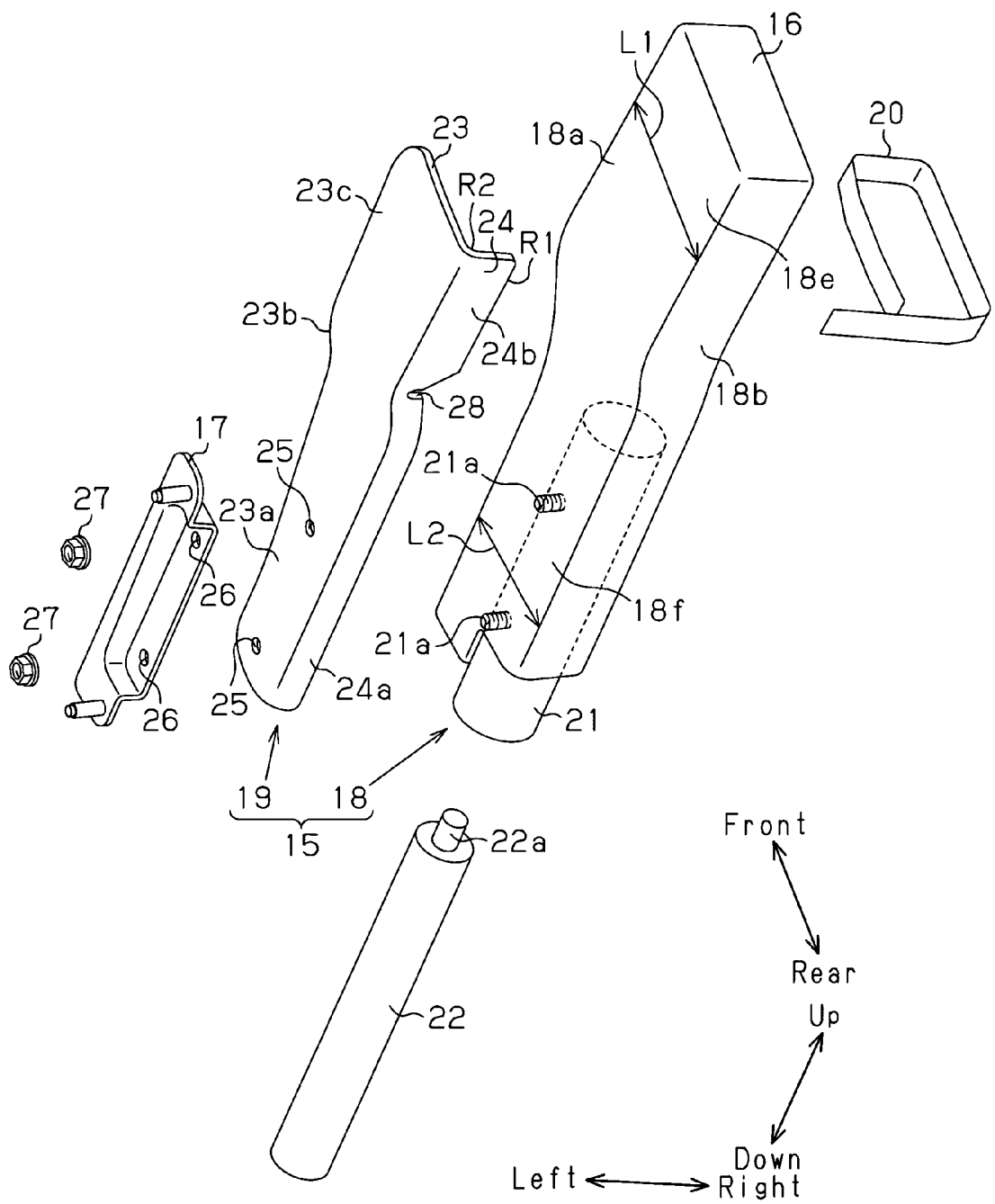
FIG. 3 is an exploded perspective view illustrating the side airbag apparatus and a bracket.

As shown in FIG. 3, the airbag unit 18 is substantially shaped like a rectangular parallelepiped that is elongated in the up-down direction. The plate 19 substantially has an L-shape along an inner side surface 18a and a rear surface 18b of the airbag unit 18. The airbag unit 18 is fixed to the plate 19. The airbag unit 18 includes an upper half portion 18e and a lower half portion 18f. A width L1 of the upper half portion 18e of the airbag unit 18 in the front-rear direction is greater than a width L2 of the lower half portion 18f in the front-rear direction. Also, the front face of the upper half portion 18e of the airbag unit 18 projects slightly forward relative to the front face of the lower half portion 18f. The upper half portion 18e of the airbag unit 18 is wrapped around the plate 19 using adhesive tape 20. The adhesive tape 20 is easily broken when the airbag 16 is inflated.

The airbag unit 18 includes the airbag 16 folded to have an elongated shape, a substantially cylindrical retainer 21, and a substantially columnar inflator 22. The retainer 21 is accommodated in the folded airbag 16 so as to extend along the longitudinal direction of the airbag unit 18 (the up-down direction). A part of the inflator 22 is inserted into the retainer 21. The inflator 22 is assembled to the lower half portion 18f of the airbag unit 18 by being retained in the retainer 21. The inflator 22 contains gas generating agent (not shown). When receiving an activation signal from a control device (not shown), the inflator 22 ignites the gas generating agent to generate gas. A gas discharge portion 22a of the inflator 22 is located in the airbag 16 when the inflator 22 is retained in the retainer 21.

The plate 19 is formed have an elongated shape extending along the longitudinal direction (up-down direction) of the airbag unit 18. The plate 19 is made of a resin material. The plate 19 has a strength not to be damaged by the expansion force of the airbag 16, as well as flexibility and elasticity. Further, the plate 19 has a fixing portion 23 to which the inner side surface 18a of the airbag unit 18 is fixed and a rear wall portion 24 covering the rear surface 18b of the airbag unit 18. The fixing portion 23 and the rear wall portion 24 are molded integrally so as to form an L in a cross section along the transverse direction the plate 19.

Figure 4A:
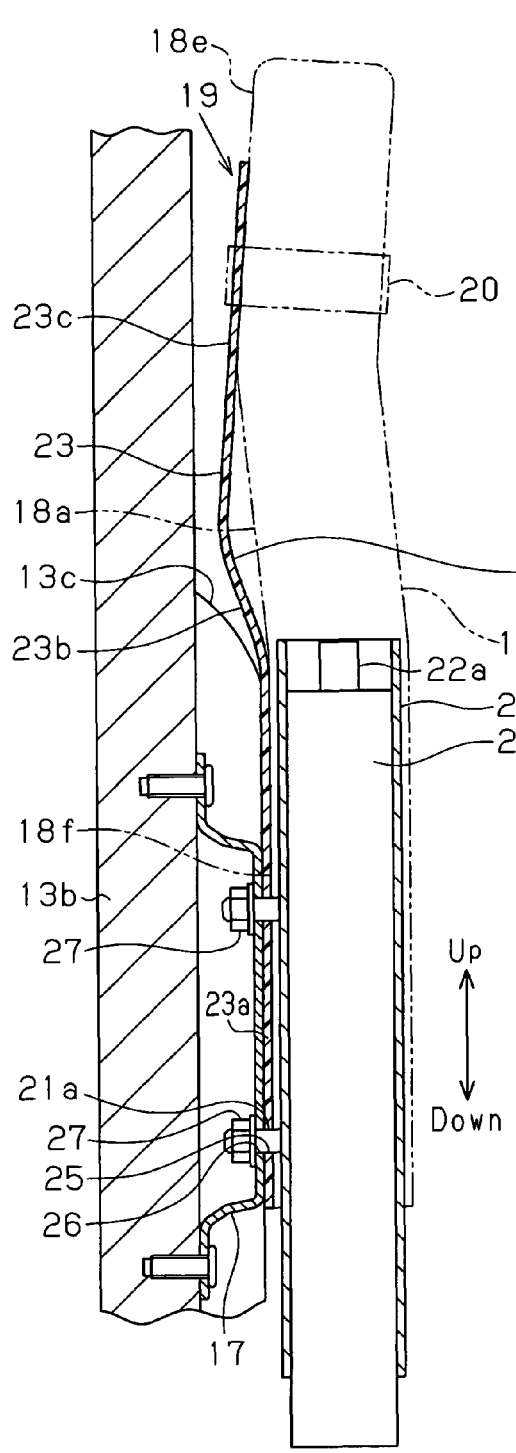
FIG. 4(a) is a longitudinal cross-sectional view illustrating the side airbag apparatus.

As shown in FIGS. 3 and 4(a), the fixing portion 23 includes a lower portion 23a, an inclined portion 23b, and an upper portion 23c. The lower portion 23a, which is a part of the fixing portion 23, extends linearly along the up-down direction of the lower half portion 18f of the airbag unit 18, and contacts the inner side surface 18a of the lower half portion 18f of the airbag unit 18. A pair of through holes 25 are formed in the lower portion 23a of the fixing portion 23. Also, a pair of through holes 26 are formed in the bracket 17. A pair of bolts 21a projecting from the retainer 21 are passed through the through holes 25 and the through holes 26. A nut 27 is screwed onto each bolt 21a. Therefore, as shown in FIG. 4(a), the inner side surface 18a of the airbag unit 18 located close to the side frame 13b and the bracket 17 are fixed to the lower portion 23a of the fixing portion 23.

The bracket 17 is attached to the side frame 13b such that the side airbag apparatus 15 is slightly separated from the side frame 13b. Accordingly, the side frame 13b has a bulging portion 13c, which bulges toward the vehicle outer side. The plate 19 is formed such that the bulging portion 13c does not contact the plate 19.

The lower portion 23a of the fixing portion 23 is connected to the upper portion 23c with the inclined portion 23b, which is inclined toward the side frame 13b. The inclined portion 23b is inclined so as to approach the side frame 13b as the bulging amount of the bulging portion 13c decreases.

The upper portion 23c of the fixing portion 23 serves as a linear portion, and extends linearly along the up-down direction. Part of the upper portion 23c contacts the inner side surface 18a of the airbag unit 18. As shown in FIG. 3, the upper portion 23c of the fixing portion 23 has a wide width in the front-rear direction in accordance with the upper half portion 18e of the airbag unit 18, which has a wide width in the front-rear direction. The upper portion 23c of the fixing portion 23 has a shape that is substantially the same as the inner side surface 18a of the upper half portion 18e of the airbag unit 18. The rear wall portion 24 is connected to the rear end of the fixing portion 23 so as to be perpendicular to the fixing portion 23.

Figure 4B:
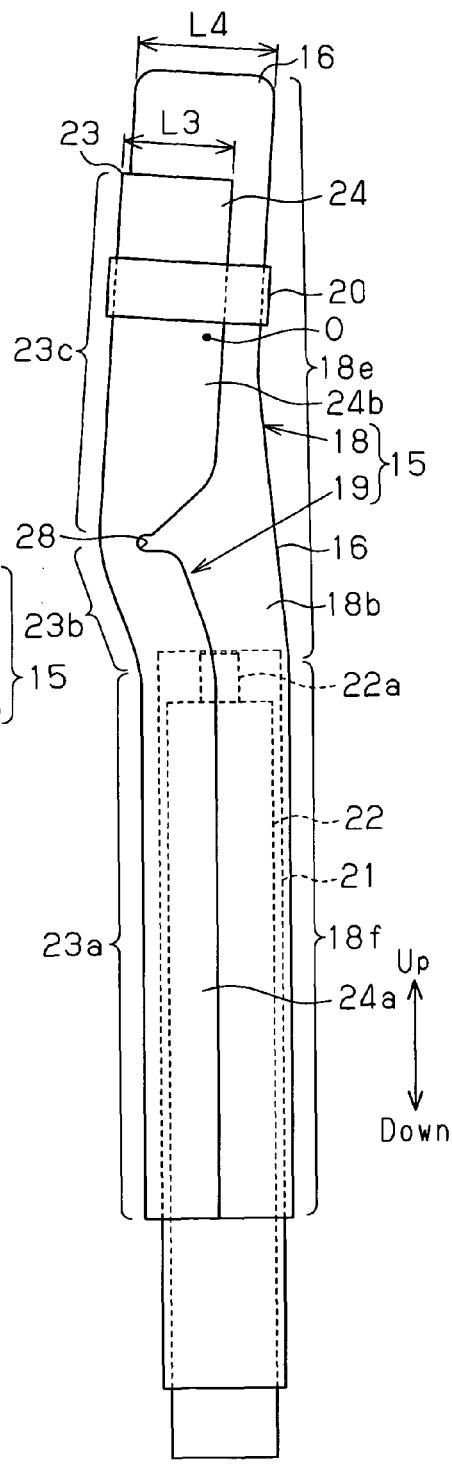
FIG. 4(b) is a side view illustrating the side airbag apparatus of FIG. 4(a)

As shown in FIG. 4(b), the length of the rear wall portion 24 in the up-down direction is set to be less than the length of the airbag unit 18 in the up-down direction. The rear wall portion 24 extends from the lower half portion 18f of the airbag unit 18 to a position above the center O of the upper half of the airbag unit 18. That is, the rear wall portion 24 substantially covers the entire rear surface 18b of the airbag unit 18 in the up-down direction. In other words, the rear wall portion 24 is formed to cover, along the up-down direction, the lower half portion 18f of the airbag unit 18 and at least a part of the upper half portion 18e of the airbag unit 18. Also, the rear wall portion 24 substantially has the same length as the fixing portion 23 in the up-down direction. Therefore, a range of the airbag unit 18 that is covered by the fixing portion 23 is the same as a range of the airbag unit 18 that is covered by the rear wall portion 24 in the up-down direction. The width L3 of the rear wall portion 24 in the left-right direction is set to be smaller than the width L4 of the airbag unit 18 in the left-right direction. A slit 28 is formed in the rear wall portion 24. The slit 28 is located at a position above the lower half portion 18f of the airbag unit 18, that is, at a position overlapping the upper half portion 18e of the airbag unit 18 when viewed from behind. The slit 28 extends from a distal end R1 of the rear wall portion 24 toward a proximal end R2 (see FIG. 3), and divides the rear wall portion 24 into a lower portion 24a and an upper portion 24b.

As shown in FIGS. 3 and 4(b), the lower portion 24a of the rear wall portion 24 covers the entire rear surface 18b of the lower half portion 18f of the airbag unit 18 and a part of the upper half portion 18e in the up-down direction. The lower portion 24a of the rear wall portion 24 is connected to the lower portion 23a of the fixing portion 23 and the inclined portion 23b of the fixing portion 23. The upper portion 24b of the rear wall portion 24 covers only a part of the rear surface 18b of the upper half portion 18e of the airbag unit 18 in the up-down direction. The upper portion 24b of the rear wall portion 24 is connected to the upper portion 23c of the fixing portion 23.

An operation of the side airbag apparatus 15 of the present embodiment will now be described.

The inner side surface 18a of the airbag unit 18 is fixed to the fixing portion 23 of the plate 19. In addition, the airbag unit 18 is attached to the side frame 13b of the seat back 13 with the plate 19 and the bracket 17. Therefore, the airbag unit 18 is held at a predetermined position in the side portion 13a of the seat back 13. The side airbag apparatus 15 has no case for accommodating the airbag unit 18. Instead, the side airbag apparatus 15 is attached to the side frame 13b with the plate 19, which covers the rear surface 18b and the inner side surface 18a of the airbag unit 18. Thus, even though the side airbag apparatus 15 has the airbag unit 18, which is elongated in the up-down direction, the size of the airbag apparatus 15 is not significantly increased.

When getting in the vehicle, the occupant P sits on the vehicle seat 11 while placing a hand on the side portion 13a of the seat back 13 in some cases. When getting out of the vehicle, the occupant P places a hand on the side portion 13a of the seat back 13 before standing up from the seated state in some cases. In such cases, the occupant P unintentionally pushes the side airbag apparatus 15 rearward. When the side airbag apparatus 15 is pushed rearward, the airbag 16 and the plate 19, which are parts of the side airbag apparatus 15, are easily flexed rearward (in the direction indicated by arrow Y1 in FIG. 1) without resisting. Therefore, the reaction applied to the occupant P by the side airbag apparatus 15 is small. Thus, when placing a hand on the seat back 13 while getting in or out of the vehicle, the occupant P is not significantly disturbed.

The upper half portion 18e of the airbag unit 18, to which the inflator 22 is not assembled, is easily flexed. Therefore, when the occupant P pushes the upper half portion 18e of the airbag unit 18 rearward by placing a hand on the seat back 13, there is a concern that the position of the upper half portion 18e of the airbag unit 18 may be displaced and that the inflation and deployment direction of the airbag 16 may be changed. However, in the present embodiment, even if the upper half portion 18e of the airbag unit 18 is temporarily displaced by being pushed rearward, the upper half portion 18e is moved forward to the original position by the elastic force of the rear wall portion 24. Thus, the airbag unit 18 is stably held in a desired position, and the inflation and deployment direction will not be changed.

The manner in which the side airbag apparatus 15 operates at a side collision will now be described.

When an impact is applied to the vehicle due to a side collision, the gas generating agent in the inflator 22 generates gas based on a detection signal from the impact sensor. The gas is supplied into the airbag 16 from the gas discharge portion 22a. When the gas is supplied into the airbag 16 from the inflator 22, the airbag 16 is inflated. Even if the airbag 16 acts to be inflated toward the vehicle inside when it inflation and deployment starts, the fixing portion 23 restricts the inflation of the airbag 16 toward the vehicle inside. Likewise, the rearward inflation of the airbag 16 is restricted by the rear wall portion 24. Therefore, as shown in FIG. 5, the airbag 16 is stably inflated and deployed outward and forward relative to the vehicle seat 11, while being guided by the plate 19.

When the inflation and deployment of the airbag 16 applies expansion force to the rear wall portion 24 of the airbag 16, the rear wall portion 24 of the plate 19 is deformed outward with its proximal end R2 serving as a hinge. That is, the L-shaped plate 19 is deformed to open. Since the inflator 22 is not assembled to the upper half portion 18e of the airbag unit 18, part of the airbag 16 that corresponds to the upper half portion 18e is easily inflated. In contrast, inflation of part of the airbag 16 that corresponds to the lower half portion 18f of the airbag unit 18 is restricted by the retainer 21 and the inflator 22. Accordingly, when the airbag 16 is inflated and deployed, the expansion force applied to the upper portion 24b of the rear wall portion 24 by the airbag 16 is greater than the expansion force applied to the lower portion 24a of the rear wall portion 24 by the airbag 16. Therefore, if the upper portion 24b and the lower portion 24a of the rear wall portions 24 were connected to each other at the same width, the rear wall portion 24 would be twisted due to the difference in the amount of deformation between the lower portion 24a and the upper portion 24b of the rear wall portion 24. This could break the plate 19. However, according to the present embodiment, a slit 28 is formed between the upper portion 24b and the lower portion 24a of the rear wall portion 24. Therefore, the upper portion 24b and the lower portion 24a of the rear wall portion 24 can be deformed independently in different manners in response to the expansion force applied by the airbag 16. Thus, even if the amount of deformation is different between the lower portion 24a and the upper portion 24b of the rear wall portion 24, the rear wall portion 24 is unlikely to be twisted. Further, the upper portion 24b of the rear wall portion 24, which is relatively greatly deformed by the expansion force of the airbag 16, is connected to the linearly extending upper portion 23c of the fixing portion 23. This structure also inhibits the rear wall portion 24 from being twisted.

Figure 5:
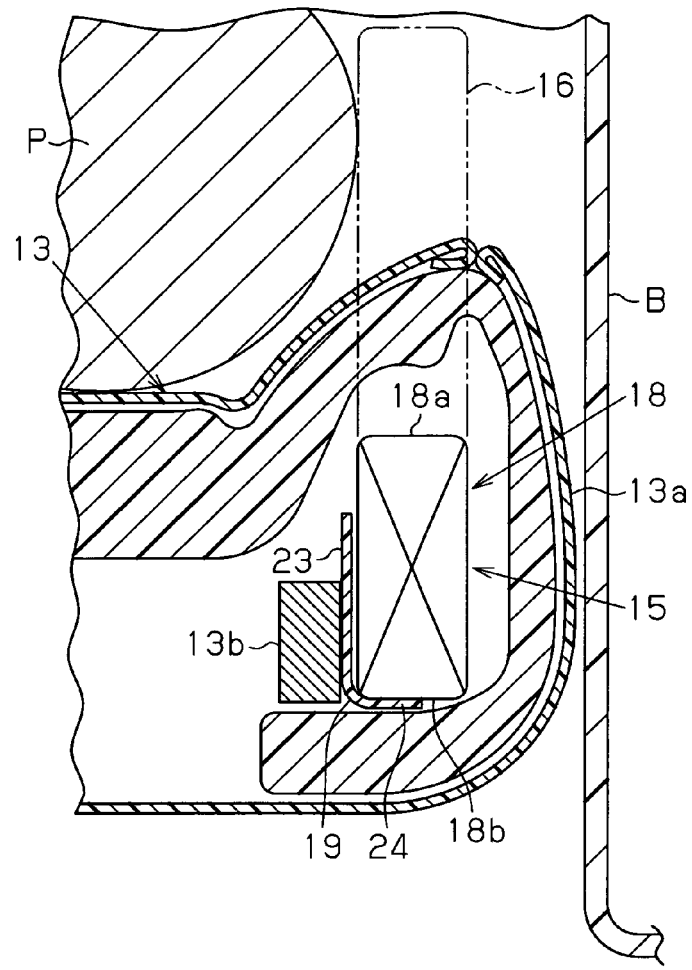
FIG. 5 is a cross-sectional view of the side airbag apparatus for explaining an operation of the airbag when it is inflated and deployed.

When the inflation and deployment is ultimately completed, the airbag 16 is located between the occupant P and the side body B as shown by the double-dashed line in FIG. 5. In this state, the airbag 16 is arranged beside a region of the occupant's body including the thorax Pb and the head Ph as shown in FIG. 6. As a result, the head Ph and the thorax Pb of the occupant P are protected.

This embodiment has the following advantages.

(1) In the side airbag apparatus 15, the airbag unit 18 is fixed to the plate 19, and the plate 19 is attached to the side frame 13b. Accordingly, the airbag unit 18 is retained in the side portion 13a of the seat back 13. Also, unlike the above described conventional apparatus, no case is employed.

Therefore, even though the airbag unit 18 is elongated in the up-down direction, the size of the airbag apparatus 15 is not significantly increased. Further, when placing a hand on the seat back 13 while getting in or out of the vehicle, the occupant P is not significantly disturbed.

(2) The rear wall portion 24 covers a part of the rear surface 18b of the airbag unit 18 and restricts the rearward inflation of the airbag 16 when the airbag 16 is inflated and deployed. This allows the airbag 16 to stably inflated and deployed forward.

(3) Even if the position of the airbag unit 18 is temporarily displaced when the upper half portion 18e of the airbag unit 18 is pushed rearward, the elastic force of the rear wall portion 24 puts the airbag unit 18 to the original position. Therefore, the airbag unit 18 can be stably retained in a desired position.

(4) Even if the expansion force applied to the rear wall portion 24 by the airbag 16 at the inflation and deployment of the airbag 16 is uneven in the up-down direction, the upper portion 24b and the lower portion 24a of the rear wall portion 24 can be separately deformed. This inhibits the rear wall portion 24 from being twisted.

(5) The entire upper portion 24b of the rear wall portion 24 is connected to the upper portion 23c of the fixing portion 23. Thus, even though the fixing portion 23 has the inclined portion 23b, twisting of the rear wall portion 24 is minimized.

(6) Being formed of a resin material, the plate 19 is easily imparted with flexibility and elasticity compared to a case where the plate 19 is made of metal.

(7) Since the width L3 of the rear wall portion 24 in the left-right direction is less than the width L4 of the airbag unit 18 in the left-right direction, the width of the plate 19 in the left-right direction is prevented from being significantly increased.

The present invention may be embodied in the following forms.

The shape of the rear wall portion 24 may be changed. For example, since the inflator 22 is assembled to the lower half portion 18f of the airbag unit 18, the rigidity of the lower half portion 18f is increased. Therefore, it is possible to omit the lower portion 24a of the rear wall portion 24, which covers a part of the rear surface 18b in the lower half portion 18f of the airbag unit 18. Even in this case, the shape of the fixing portion 23 does not need to be changed. Since the rear wall portion 24 covers the rear surface 18b of the upper half portion 18e of the airbag unit 18, the airbag unit 18 can be retained in a predetermined position.

If the rear wall portion 24 has a sufficient strength not to be damaged when being twisted by the expansion force applied by the inflation and deployment of the airbag 16, the slit 28 may be omitted.

The width of the fixing portion 23 in the front-rear direction may be changed. The width of the fixing portion 23 in the front-rear direction may be changed as long as it is sufficient for fixing the inner side surface 18a of the airbag unit 18. For example, the width of the fixing portion 23 in the front-rear direction may be reduced.

The position at which the side frame 13b is attached to the plate 19 may be changed. For example, the rear wall portion 24 may be attached to the side frame 13b.

The plate 19 may be formed of a different material. For example, the plate 19 may be formed of hard rubber, which is obtained by hardening synthetic rubber.

The fixing portion 23 and the rear wall portion 24 of the plate 19 may be formed as separate members. In this case, the fixing portion and the rear wall portion are mechanically connected to each other to form the plate 19.

The adhesive tape 20 may be omitted if the airbag unit 18 is allowed to contact the plate 19 to a sufficient degree.

The present invention is embodied in the side airbag apparatus 15, in which the airbag 16 is inflated and deployed between the occupant P and the body side B. However, the present invention may be embodied in an airbag apparatus of a different type. For example, the present invention may be embodied in a "far side" airbag apparatus, which is located on a side portion of the seat back 13 that is on the vehicle inner side. In this case, the airbag 16 is inflated and deployed between two occupants P seated on a pair of vehicle seats 11 arranged side by side in the widthwise direction of the vehicle.

As long as the apparatus has the airbag 16, which is elongated in the up-down direction in the folded state, the present invention may be applied to any airbag apparatuses other than the side airbag apparatus 15, which is designed for protecting the thorax Pb and the head Ph of an occupant P.

For example, the present invention may be applied to a side airbag apparatus 15 that is designed for protecting the thorax Pb and the lumbar region of an occupant P.

Therefore, the present examples and embodiments are to be considered as illustrative and not restrictive and the invention is not to be limited to the details given herein, but may be modified within the scope and equivalence of the appended claims.

The invention claimed is:

1. A side airbag apparatus provided in a side portion of a seat back of a vehicle seat, comprising:
   an elongated airbag unit extending in an up-down direction, the airbag unit having a folded airbag and an inflator installed in the airbag;
   wherein, at a side collision of a vehicle, the airbag is inflated and deployed outward and forward in relation to the vehicle seat, and
   a plate for installing the airbag unit in the side portion of the seat back,
   wherein the plate includes:
   a fixing portion to which an inner side surface of the airbag unit is fixed; and
   a rear wall portion connected to the fixing portion, the rear wall portion covering at least a part of a rear surface of the airbag unit, the part being located above the inflator,
   wherein
   the plate has flexibility and elasticity,
   the inflator is located below an upper half portion of the airbag unit,
   the rear wall portion is formed to cover, along the up-down direction, a lower half portion of the airbag unit and at least a part of the upper half portion of the airbag unit,
   the rear wall portion has a slit located above the inflator, and
   the rear wall portion is divided into an upper portion and a lower portion by the slit.

2. The side airbag apparatus according to claim 1, wherein, in accordance with the rear wall portion, the fixing portion is formed to cover the lower half portion of the airbag unit and the at least a part of the upper half portion of the airbag unit, wherein the fixing portion includes an inclined portion and a linear portion, the inclined portion being inclined relative to the airbag unit at a position above the inflator, and the linear portion linearly extending from the inclined portion, and
wherein the slit is formed at a position above the inclined portion.

3. The side airbag apparatus according to claim 1, wherein the plate is made of a resin material.

4. The side airbag apparatus according to claim 1, wherein the airbag unit has a plurality of surfaces including the inner side surface and the rear surface, and wherein only the inner side surface and the rear surface are covered by the plate.

5. The side airbag apparatus according to claim 1, wherein a width of the rear wall portion in a lateral direction is less than a width of the airbag unit in the lateral direction.

* * * * *